(12) United States Patent
Bohn et al.

(10) Patent No.: US 10,350,803 B2
(45) Date of Patent: Jul. 16, 2019

(54) INJECTION MOLDING APPARATUS HAVING COOLED CORE SLIDERS

(71) Applicant: Otto Männer Innovation GmbH, Bahlingen (DE)

(72) Inventors: Klaus Bohn, Teningen (DE); Lothar Weber, Eichstetten (DE)

(73) Assignee: OTTO MÄNNER INNOVATION GMBH, Bahlingen (DE)

(*) Notice: Subject to any disclaimer, the term of this patent is extended or adjusted under 35 U.S.C. 154(b) by 128 days.

(21) Appl. No.: 15/197,374

(22) Filed: Jun. 29, 2016

(65) Prior Publication Data

US 2016/0375621 A1 Dec. 29, 2016

Related U.S. Application Data

(60) Provisional application No. 62/186,258, filed on Jun. 29, 2015.

(51) Int. Cl.
| | |
|---|---|
| *B29C 45/73* | (2006.01) |
| *B29C 45/40* | (2006.01) |
| *B29C 45/74* | (2006.01) |
| *B29L 22/00* | (2006.01) |
| *B29C 45/33* | (2006.01) |

(52) U.S. Cl.
CPC .......... *B29C 45/7312* (2013.01); *B29C 45/40* (2013.01); *B29C 45/73* (2013.01); *B29C 45/33* (2013.01); *B29C 2045/4078* (2013.01); *B29L 2022/00* (2013.01)

(58) Field of Classification Search
CPC . B29C 45/40; B29C 45/33; B29C 2045/4078; B29C 45/7312; B29C 45/73
USPC ................. 425/548; 164/137, 340, 341, 342
See application file for complete search history.

(56) References Cited

U.S. PATENT DOCUMENTS

| 4,362,291 A * | 12/1982 | Fuke ................. B22D 17/2236 249/144 |
|---|---|---|
| 2003/0099794 A1* | 5/2003 | Sasaki .................... B29C 45/14 428/35.7 |
| 2007/0204969 A1* | 9/2007 | Whealy ............. B22D 17/2218 164/137 |

\* cited by examiner

*Primary Examiner* — Joseph S Del Sole
*Assistant Examiner* — Mohamed K Ahmed Ali
(74) *Attorney, Agent, or Firm* — McAndrews, Held & Malloy, Ltd.

(57) ABSTRACT

An injection molding apparatus is used for making parts having a hollow portion that is disposed under an angle relative to an axis. The molded parts are ejected when a movable stripper plate is displaced relative to the mold core used to cool the angled portion of the molded part. The stripper plate includes cooling channels and a cooling outlet. The cooling outlet is coupled to a cooling inlet of a movable cooling slider element. Leakage of a cooling fluid is prevented by using a sealing device and sealing elements between the cooling slider and a cooling manifold retaining the mold cores when the stripper plate is used during the ejection of the molded parts from the mold cores.

15 Claims, 11 Drawing Sheets

INJECTION MOLDING APPARATUS HAVING COOLED CORE SLIDERS

CROSS-REFERENCE TO RELATED APPLICATIONS

This application claims benefit of priority from U.S. Provisional Patent Application No. 62/186,258, filed Jun. 29, 2015, which is hereby incorporated by reference in its entirety herein.

FIELD

This present disclosure is related to an injection molding apparatus having stripper plates and including movable cooled slider elements coupled to cooled mold cores and a method of cooling mold cores via movable slider elements during stripping of molded parts.

BACKGROUND

Injection molding of plastic parts using cold runner and hot runner systems is known. Several devices and techniques have been used to remove the plastic parts from the molds using stripper plates and ejectors when the molded has a geometry that allows the ejection from the core or cavity along a single axis that corresponds to the direction of opening and closing the cavity via the movements of the mold plates coupled to the injection molding machine platens.

Reference is made in this regard to U.S. Pat. Nos. 3,905,740, 5,865,241, and 7,234,930 and to WO Patent Publication No. 2012/045173.

Unlike in the above mentioned references, there are applications in the injection molding industry where the shape of the molded part is not axially symmetrical and has different portions arranged under an angle that have a hollow shape. This requires a special design of the mold cavity and a need to have cooling cores arranged at different angles relative to a main axis defined by the opening and closing of the mold to allow the final molded part to be cooled and ejected from the mold cores.

These molded parts may have in some applications a body having at least two interconnected segments where the segments are hollow and each segment has an axis, the axis of one segment being angled with respect to the axis of the other segment.

To properly mold such a part having angled hollow parts the cooling circuits of the cores and cavities need to be specially designed to meet both the cooling requirements and the constraints of the mold design, especially when there is a need for high cavity molds having a tight pitch between the mold cores and cavities.

Such molded parts are often needed for medical devices and such parts need to be molded not only accurately but also in large quantities and in a short period of time. This translates in the need to have accurate molds having a large number of mold cavities and a relative short cycle time.

These parts can be molded using both cold runner molds and hot runner molds. In the event a hot runner mold is selected, the hot runner system includes a manifold and several hot runner nozzles that can be either valve gated or thermal gated.

In the event where a hot runner system having movable valve pins is needed to mold these parts, the spacing on the mold side is rather limited and the cooling elements and cooling conduits need to be adapted and further improved to meet the quality requirements of the parts and the productivity demands.

There is a need to further improve the cooling of the cores when they are surrounded by a movable stripper plate having cooling channels.

SUMMARY

A cold runner mold or a hot runner system using movable valve pins or thermal gating is associated with a mold that includes several tight pitch mold cavities and corresponding cores.

According to an embodiment of the present disclosure, each mold cavity is shaped in a manner that allows the molded part to have two coupled hollow segments oriented at angle relative to each other.

According to an embodiment of the present disclosure, the two hollow segments are molded at the same time using a single mold cavity having two mold cavity segments that are angled with respect to each other. Each mold cavity segment is formed around a cooled mold core, the mold cores being also angled one with respect to the other. For this reason, in order to eject the final molded part, one of the mold cores needs to be in a retracted position to allow the molded part to be removed from the other mold core along an axis that corresponds to the direction of opening and closing the mold cavities via the movement of the machine platens of an injection molding machine.

According to an embodiment of the present disclosure, several mold cores are secured or coupled to a mold core cooling manifold having several cooling channels. A cooling fluid is provided to the cooling manifold by a cooling slider or cooling sliding element coupled to a stripper plate. The interface between an output port of the sliding element and an input port of the cooling manifold is continuously sealed via a sealing element during the relative movement of the sliding element relative to the cooling manifold that delivers cooling fluid to the mold cores.

According to an embodiment of the present disclosure, an injection molding apparatus may be used to manufacture a plurality of molded parts, each molded part having at least one hollow portion that is angled relative to the direction of removal of the molded part from the mold. The injection molding apparatus may comprise a plurality of injection nozzles coupled to a manifold, where each nozzle includes a nozzle tip; a plurality of mold cavities, where each mold cavity is defined by a first mold cavity portion and a second mold cavity portion coupled to the first mold cavity portion; a plurality of first and second mold cores, where each first mold core is angled with respect to the respective second mold core; a stripper plate comprising bores that is movable from a first position to a second position when the mold is in a closed position and in an open position, where the mold cores are at least partially located in the bores of the stripper plate; a movable cooling slider including at least one inlet fluid channel and at least one outlet fluid channel; a mold plate including at least one fluid cooling channel and at least one outlet fluid channel; and a fluid sealing system located between the mold plate and the cooling slider, the fluid sealing system including at least one sealing insert configured to retain the sealing elements and to retain cooling fluid when the slider moves and it becomes offset with respect to the at least one outlet fluid channel from the mold plate that provides the cooling fluid for the plurality of mold cores.

According to an embodiment of the present disclosure, an injection molding apparatus may be used to manufacture a plurality of molded parts, each molded part having at least one hollow portion that is angled relative to the direction of removal of the molded part from the mold. The injection molding apparatus may comprise a plurality of injection nozzles coupled to a manifold, where each nozzle includes a nozzle tip; a plurality of mold cavities, where each cavity is defined by a first mold cavity insert and a second mold cavity insert associated with a first mold core and respectively a second mold core, and where the two mold cavity inserts and the two mold cores are angled with respect to each other; a stripper plate movable from a first position to a second position when the mold is in a closed position and an open position; a movable sliding element having a first sliding surface, the sliding element being coupled to the stripper plate, the sliding element including a first network of fluid cooling channels and a cooling fluid slider inlet port and a cooling fluid slider outlet port; a stationary core cooling manifold supporting the second mold cores, the core cooling manifold including a second sliding surface and a second network of fluid cooling channels and a manifold cooling fluid inlet port and manifold cooling fluid outlet port; and a cooling fluid sealing device including a fluid sealing element, wherein the sealing device and the sealing element are positioned at an interface between the first sliding surface and the second sliding surface.

An injection molding apparatus is used for making parts having a hollow portion that is disposed under an angle relative to an axis. The molded parts are ejected when a movable stripper plate is displaced relative to the mold core used to cool the angled portion of the molded part. The stripper plate includes cooling channels and a cooling outlet. The cooling outlet is coupled to a cooling inlet of a movable cooling slider element. Leakage of a cooling fluid is prevented by using a sealing device and sealing elements between the cooling slider and a cooling manifold retaining the mold cores when the stripper plate is displace during the ejection of the molded parts from the mold cores.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF SEVERAL VIEWS OF THE DRAWINGS

The following is a description of the examples depicted in the accompanying drawings. The figures are not necessarily to scale, and certain features and certain views of the figures may be shown exaggerated in scale or in schematic in the interest of clarity or conciseness.

FIG. 1 a shows in a partial cross section an embodiment of a hot runner apparatus used to mold parts having hollow body portions disposed under an angle relative to each other.

FIG. 2 shows in cross section a molded part that is made using a hot runner system and a mold core cooling system according to an embodiment of the present disclosure, for example according to the embodiment shown in FIG. 1 a.

Figure 1:
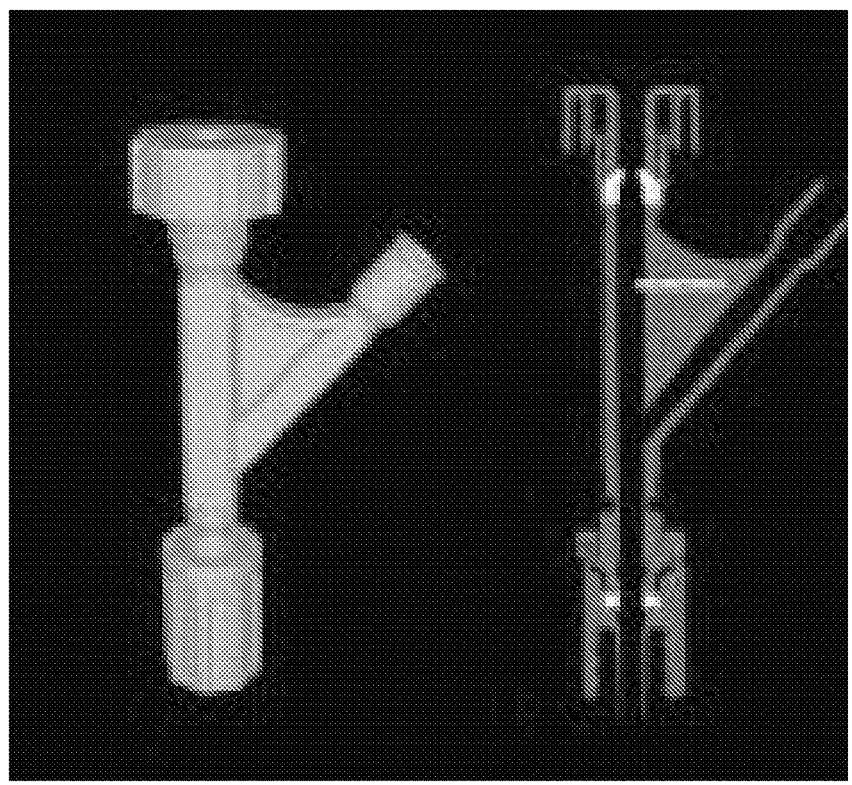
FIG. 1 shows a prior art molded part having two hollow body segments having axis that are angled relative to each other.
Figure 1A:
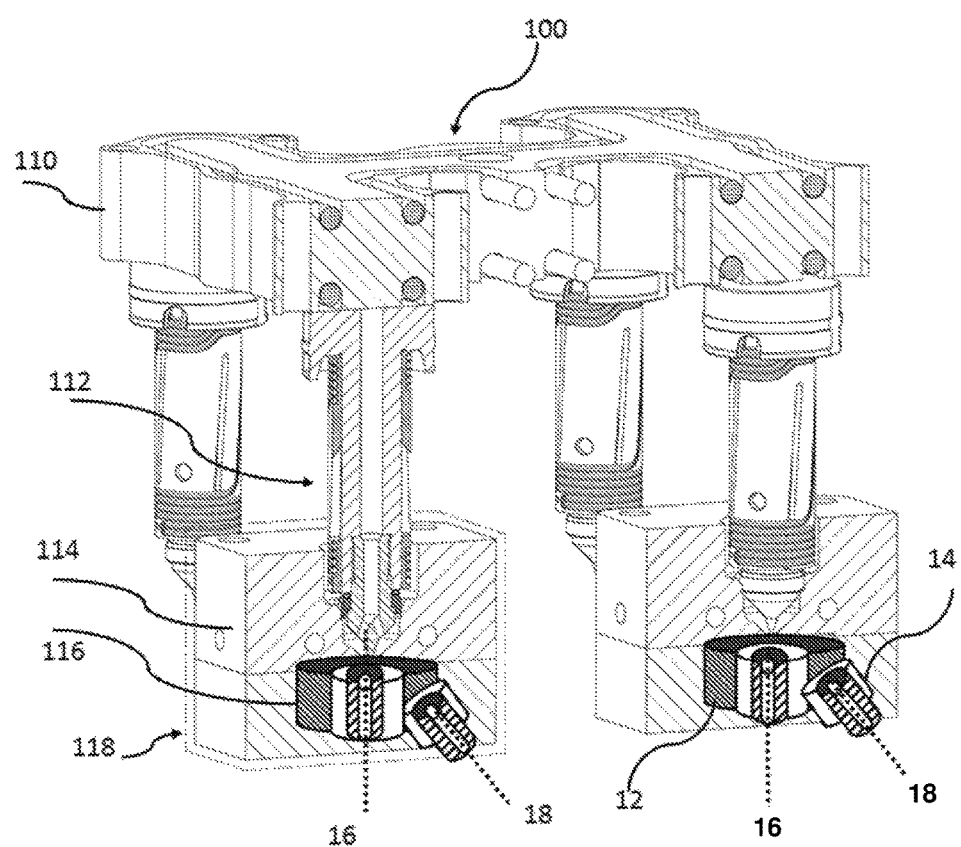

The foregoing summary, as well as the following detailed description of certain inventive techniques, will be better understood when read in conjunction with the figures. It should be understood that the claims are not limited to the arrangements and instrumentality shown in the figures. Furthermore, the appearance shown in the figures is one of many ornamental appearances that can be employed to achieve the stated functions of the apparatus.

DETAILED DESCRIPTION

In the following detailed description, specific details may be set forth in order to provide a thorough understanding of embodiments of the present invention. However, it will be clear to one skilled in the art when embodiments of the present invention may be practiced without some or all of these specific details. In other instances, well-known features or processes may not be described in detail so as not to unnecessarily obscure the invention. In addition, like or identical reference numerals may be used to identify common or similar elements.

FIG. 1 shows a prior art molded part having two hollow body segments having axes that are angled relative to each other.

FIG. 1 a shows in partial cross section an embodiment where the injection molding system 100 includes a manifold 110, hot runner nozzles 112, mold plate 114, and the mold cavity and core assemblies 118. The mold is made of two sections 12 and 14 configured to mold hollow articles having angularly displaced portions, such as shown in FIG. 1. Each assembly 118 includes cooled mold cores that are disposed along axis 16 and 18 that form an angle. Such parts are difficult to eject and for this reason special stripper plates are needed.

Figure 2:
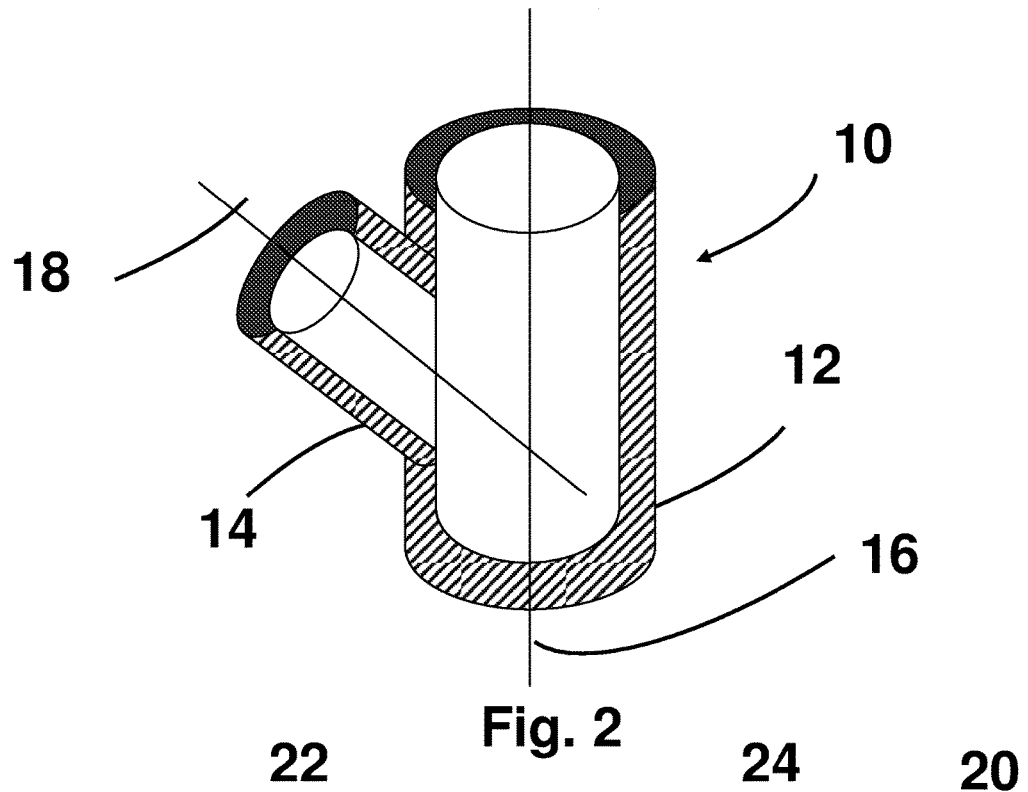

FIG. 2 shows in cross section a molded part 10 that is made using a hot runner system and a mold core cooling system according to an embodiment of the present disclosure. Molded part 10 includes a first hollow segment 12 and a second hollow segment 14, each having respective axes 16 and 18. The two axes are angled relative to each other. Axis 16 is positioned relative to a mold cavity in a manner that allows the ejection of the molded part 10 along a direction parallel to the movement of a stripper plate.

The injection molding apparatus is used for making parts having a hollow portion that is disposed under an angle relative to an axis. The molded parts are ejected when a movable stripper plate is displaced relative to the mold core used to cool the angled portion of the molded part. The stripper plate includes cooling channels and a cooling outlet. The cooling outlet is coupled to a cooling inlet of a movable cooling slider element. Leakage of a cooling fluid is prevented by using a sealing device and sealing elements between the cooling slider and a cooling manifold retaining the mold cores when the stripper plate is used during the ejection of the molded parts from the mold cores.

Figure 3:
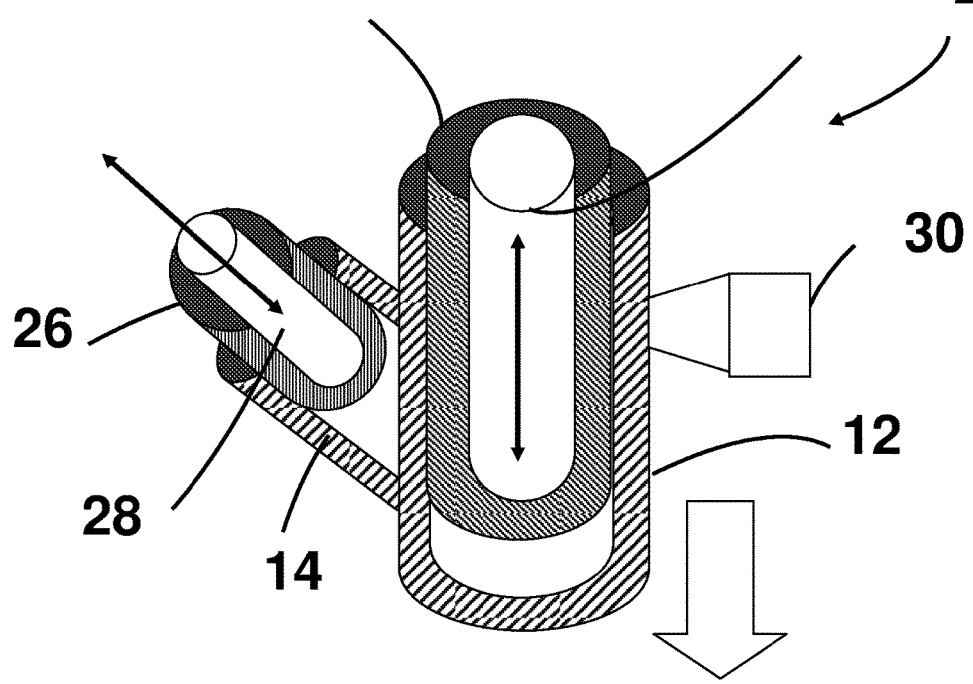
FIG. 3 shows in cross section a molded part and a detailed portion of a hot runner system and a mold core cooling arrangement according to an embodiment of the present disclosure.

FIG. 3 shows in cross section a molded part and a detailed portion of a hot runner system and a mold core cooling system 20 according to an embodiment of the present disclosure. A first mold core 22 having a cooling channel 24 is used to define a first mold cavity segment and a second mold core 26 having a cooling channel 28 is used to define a second mold cavity segment. A nozzle tip 30 associated to a hot runner nozzle and a hot runner manifold is used to provide molten material to the mold cavity. The hot runner nozzle may be a thermal gated nozzle. The hot runner nozzle may include a valve pin actuated by pneumatic or electric actuators. In FIG. 3, a side gating nozzle having a corresponding valve pin actuator is used to mold several molded parts 10.

Figure 4A:
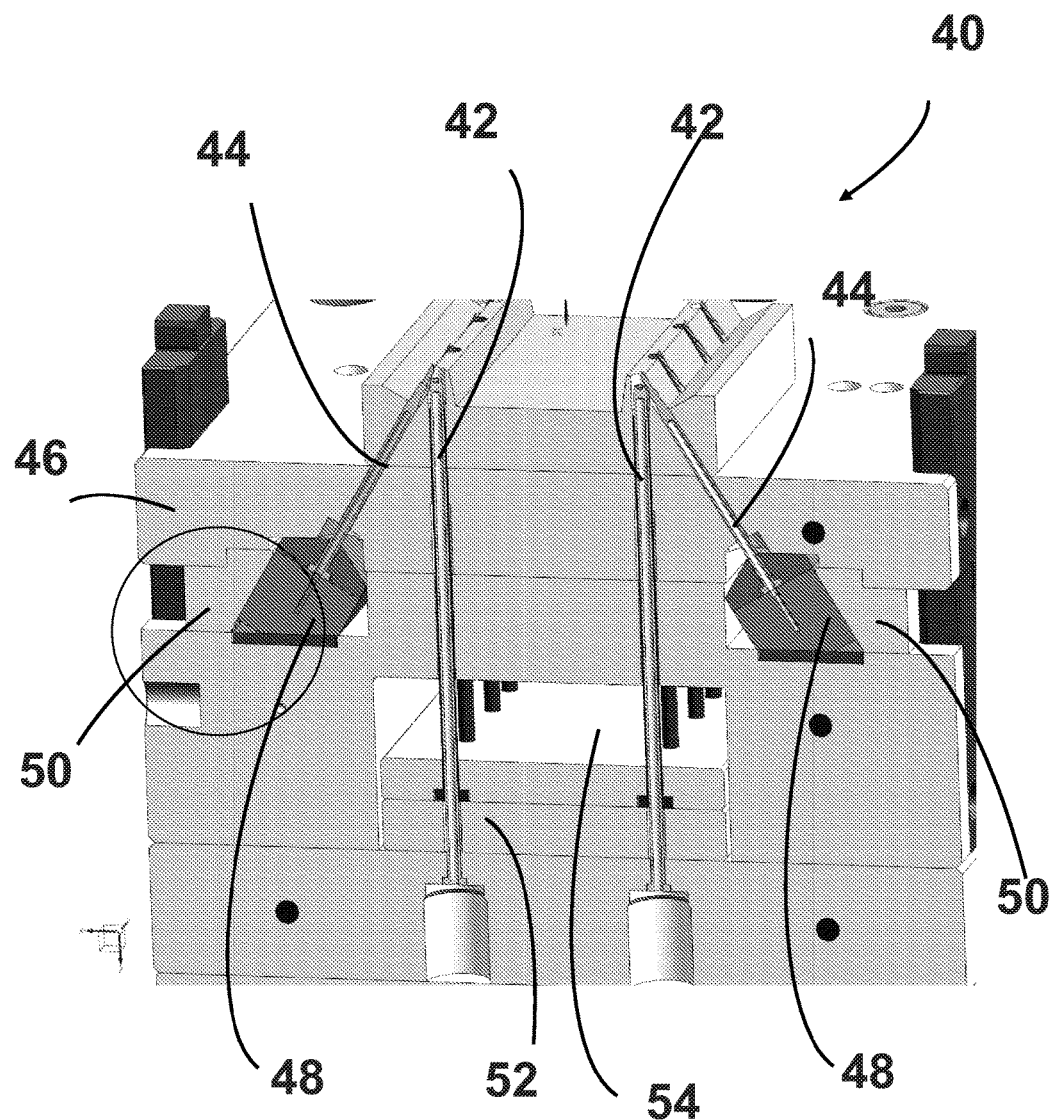
FIGS. 4a, 4b, and 4c show in cross section a portion of a hot runner system and a mold core cooling system according to an embodiment of the present disclosure in different stages of stripping and the ejection of the molded parts shown as an example in FIG. 2.
Figure 4B:
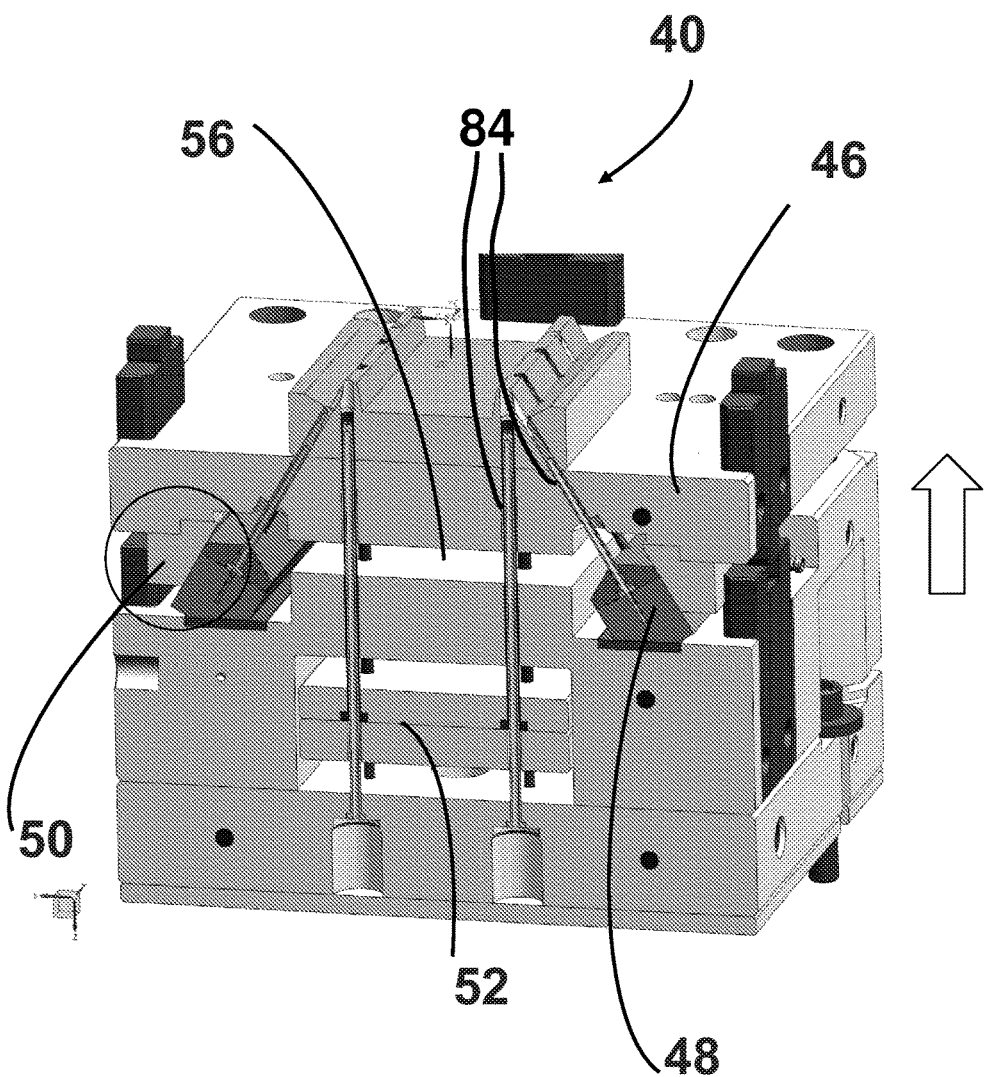
Figure 4C:
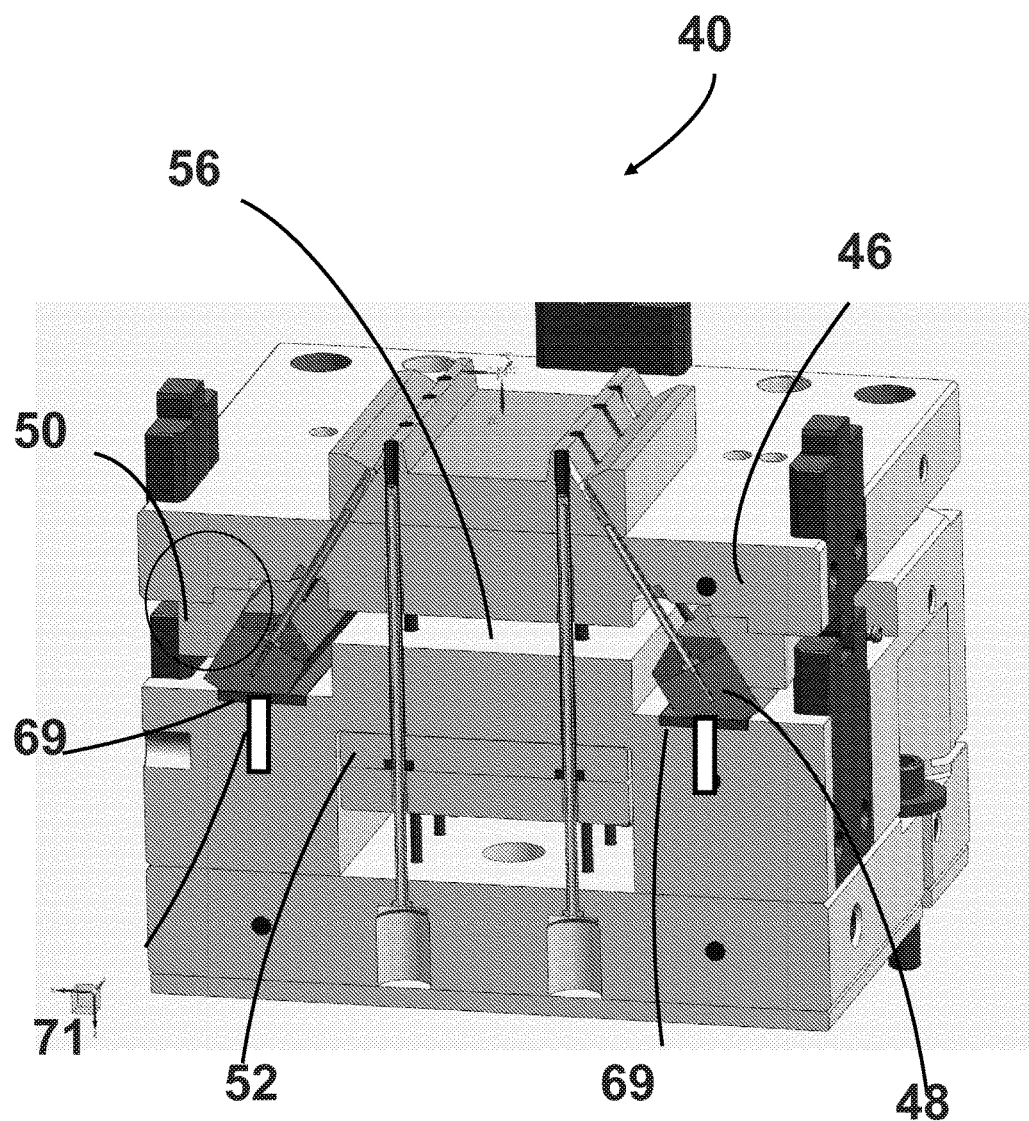
Figure 4:
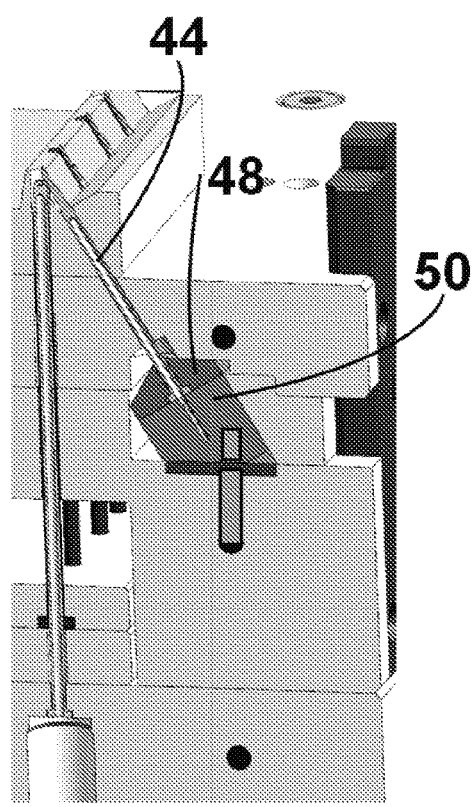
FIGS. 4d, 4e, and 4f show in cross section details of the embodiments shown in FIGS. 4a, 4b, and 4c.
Figure 4:
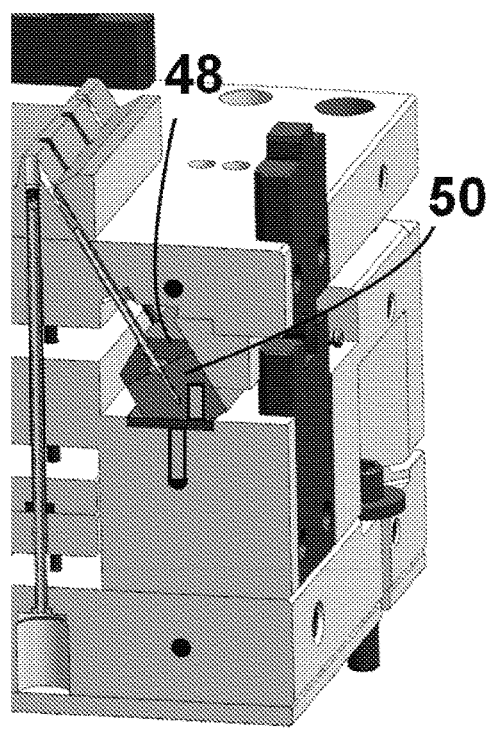
Figure 4:
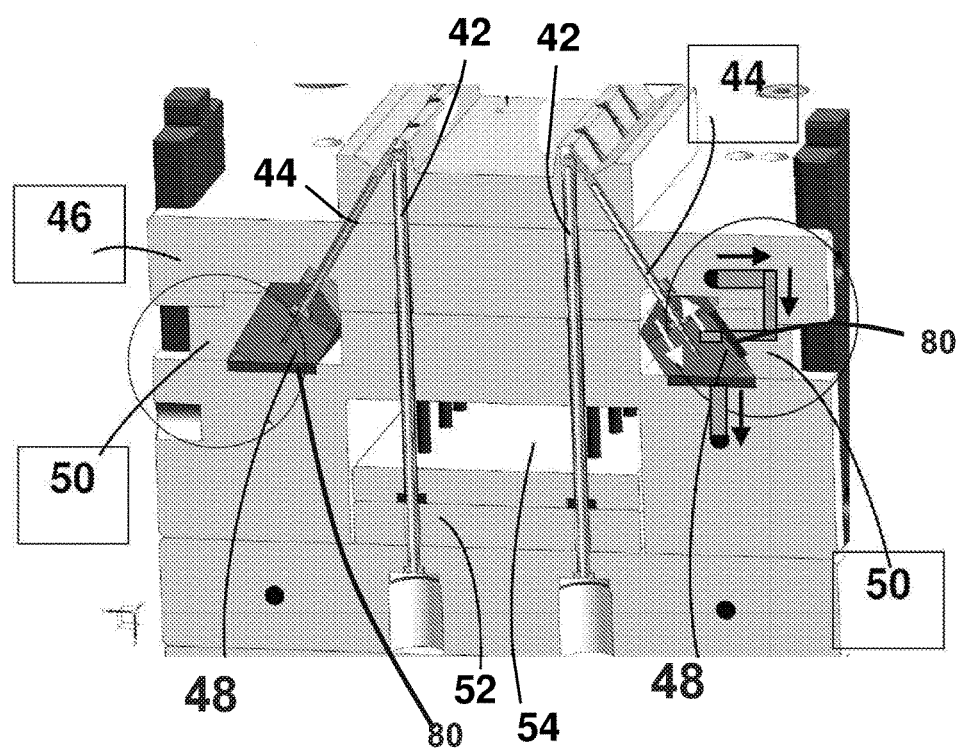

FIGS. 4a, 4b, and 4c show in cross section a portion of a hot runner system and a mold core cooling system 40 according to an embodiment of the present disclosure in different stages of the ejection of the molded parts shown as an example in FIG. 2. Some elements of FIG. 3 are similar to corresponding elements of FIGS. 4a, 4b, and 4c with slight design differences but same functionality. In FIGS. 4a, 4b, and 4c, a plurality of first and second cooling cores 42 and 44 are part of two rows of injection molding cavities each corresponding to a molded part 10. A stripper plate 46 is movable between a first and a second position. Two opposed sliding elements or cooling sliders 50 are coupled to and movable with the stripper plate 46. Two opposed core cooling manifolds 48 holding cavity cooling cores 44 include fluid cooling channels to cool the cores after the injection step.

In order to eject the molded part, the stripper plate 46 is moved towards the end of the mold core to disengage the core from the molded part and allow the ejector plate 52 to move into air gap 54 and remove the molded part from the core. The movement of the sliding element may be generated by the movement of the stripper plate during ejection of molded parts from the mold cores.

The cooling slider 50 can be positioned at any place between a mold plate that has cooling channels and the cooling manifold linked to the mold cores, providing that a sealing devise and sealing inserts and seals are positioned between the mold plate and the cooling slider.

In the embodiments shown in FIGS. 4a, 4b, and 4c, the function of the cooling slider can be reversed depending on the way the cooling fluid is brought to the water manifold. This means that in FIG. 4c, element 48 can be the cooling slider.

The stripper plate 46 includes bores 84 that allow the mold cores to be within the stripper plate 46. The stripper plate 46 may be movable from a first position to a second position when the mold is in an open position or in a closed position, or only in an open position, or only in a closed position.

In the embodiments shown in FIGS. 4d and 4e, the movement of the cooling sliders is illustrated between a first position of the stripper plate and a second position of the stripper plate and where the cooling fluid is delivered to the water manifold without leakage when the sliders inlet channels are not in alignment with the fluid outlet channel of the adjacent mold plate.

In the embodiment shown in FIG. 4f, some of the key elements like the cooling slider 50 have been displaced close to the stripping plate that provides the inlet cooling fluid. In this case there is a need to have two sealing assemblies 80.

Figure 5A:
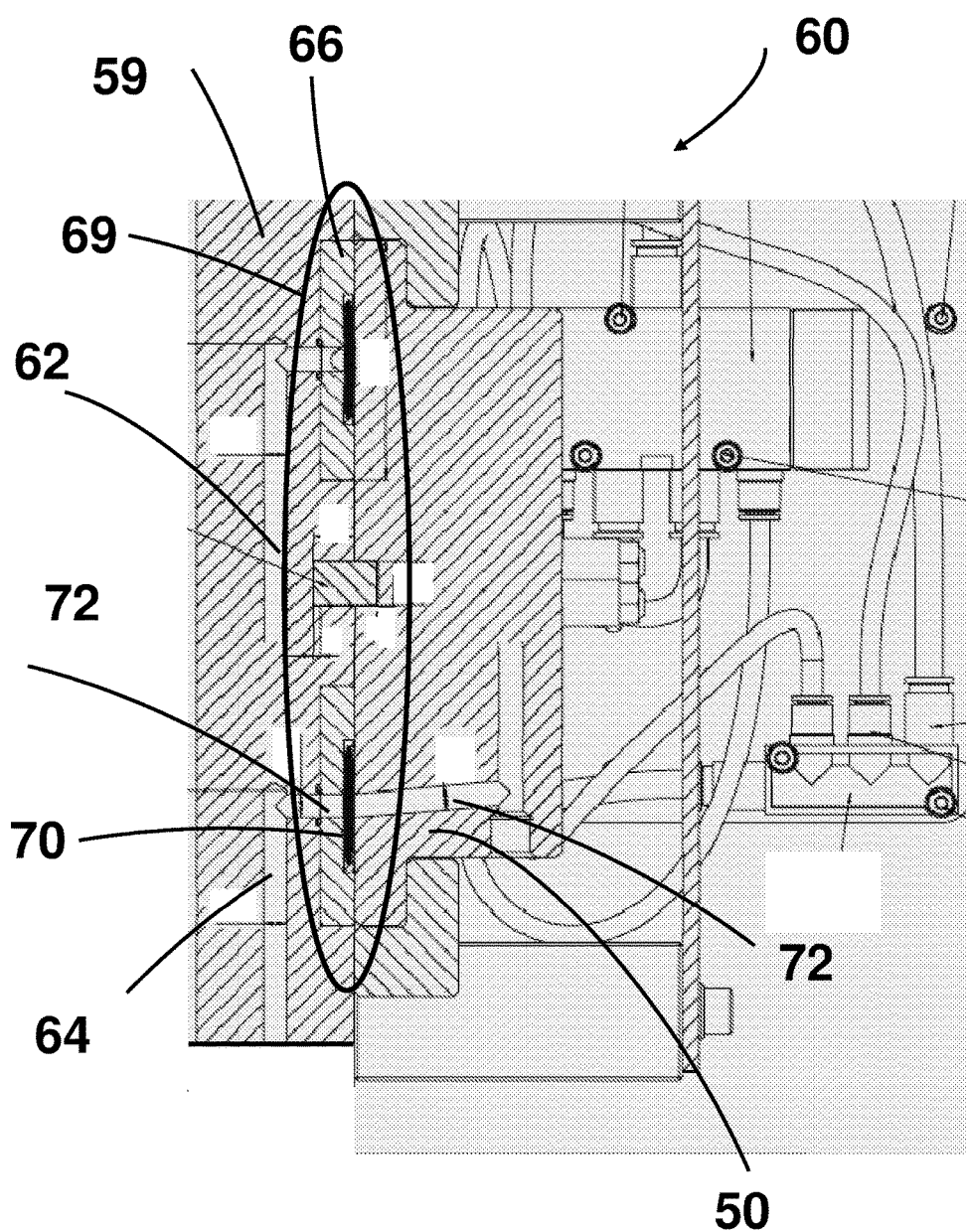
FIGS. 5a and 5b show in cross section more details of another embodiment with focus on elements that contribute to the transfer of the cooling fluid from the mold plate to the water manifold and mold cores via the movable cooling slider and the sealing components.
Figure 5B:
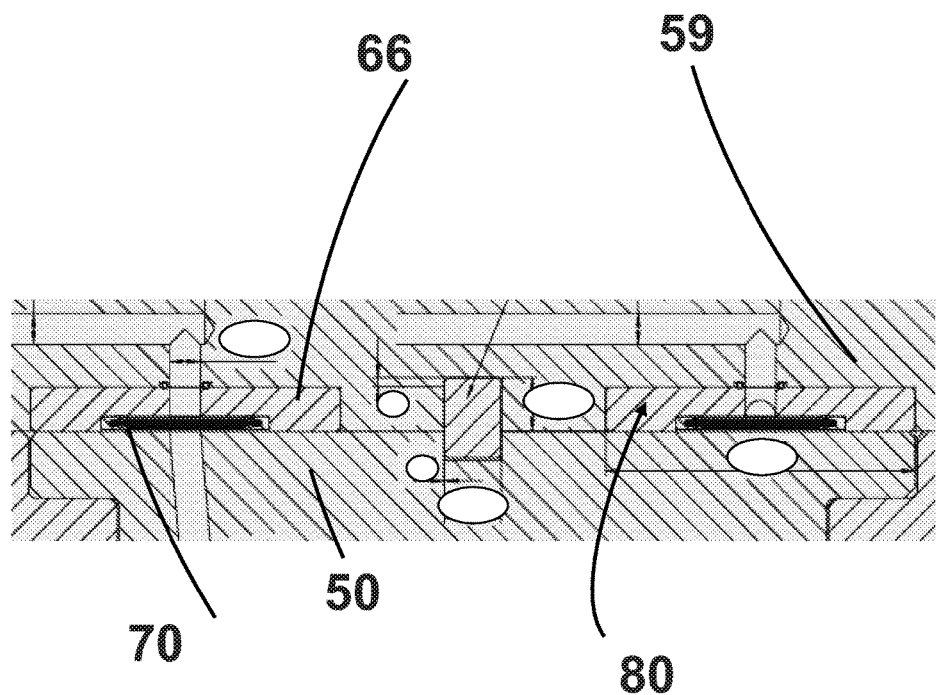

FIGS. 5a and 5b show a first portion and a detail of the first portion of the transfer area between a cooling slider and towards cooled cores according to another embodiment of the present disclosure. The embodiment shown in FIGS. 5a and 5b is a detail of a design solution that can be implemented with minor changes in various mold designs. This depends on the position of the cooling fluid outlet channel that can be from a mold plate (as in the embodiment shown in FIG. 4c) or from the stripper plate 46. In FIG. 5a, the transfer fluid cooling and fluid sealing system 60 includes the inlet ports and the outlet ports that are used to convey the cooling fluid from the sliders 48 to the cooling cores via the cooling manifold without leakage of the fluid by using sealing elements 70, which could be O rings made of proper materials that withstand the forces and the wear caused by moving the sliders. Optionally, the sealing elements 70 may be circular or oval.

Cooling fluid running via cooling channel 62 and 64 of the slider is delivered via sealing inserts 66 that are trapped and locked. The sealing inserts 66 are shaped to retain the sealing elements 70 and to retain cooling fluid when the slider moves and it becomes offset with respect with the fluid channels from the mold plate that provides the cooling fluid. When the outlet and the inlet fluid channels are displaced during the movement of the slider the sealing elements continue to prevent the leakage of the cooling fluid. It may be very important to ensure a leak free flow of the cooling fluid from outlet fluid channel 72 of mold plate 59 to inlet fluid channel 74 of the cooling slider 50 via the sealing inserts 66 when the cooling slider moves and the fluid channel 74 is offset relative to the fluid channel 72 during the steps of stripping the molded parts from the cores 42-44 and ejecting them using the ejector plate 52. It may be important to clamp the assembly 80 of sealing insert 66 and seal 70 between the cooling slider and the mold plate.

Some of the elements described herein are identified explicitly as being optional, while other elements are not identified in this way. Even if not identified as such, it will be noted that, in some embodiments, some of these other elements are not intended to be interpreted as being necessary, and would be understood by one skilled in the art as being optional.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A fluid sealing system for an injection molding apparatus,
    wherein the fluid sealing system comprises a cooling fluid sealing device including a fluid sealing element and is located between a cooling slider and a mold plate,
    wherein the mold plate includes at least one fluid cooling channel, at least one outlet fluid channel, and a first sliding surface,
    wherein the cooling slider includes at least one inlet fluid channel, at least one outlet fluid channel, and a second sliding surface, and
    wherein the fluid sealing device and the fluid sealing element are positioned at the interface between the first sliding surface and the second sliding surface.

2. The fluid sealing system of claim 1, wherein the fluid sealing system further comprises a sealing insert configured to retain the sealing element and to retain cooling fluid when the cooling slider moves and it becomes offset with respect to at least one fluid channel.

3. The fluid sealing system of claim 1, wherein the fluid sealing element is an O ring.

4. The fluid sealing system of claim 3, wherein the O ring is circular.

5. The fluid sealing system of claim 3, wherein the O ring is oval.

6. The fluid sealing system of claim 1, wherein the cooling slider includes a plurality of outlet fluid channels.

7. The fluid sealing system of claim 1, wherein the mold plate includes a plurality of fluid cooling channels.

8. The fluid sealing system of claim 1, wherein the mold plate includes a plurality of outlet fluid channels.

9. An injection molding apparatus to manufacture a plurality of molded parts, each molded part having at least one hollow portion that is angled relative to the direction of removal of the molded part from the mold, the injection molding apparatus comprising:
- a plurality of injection nozzles coupled to a manifold, where each nozzle includes a nozzle tip;
- a plurality of mold cavities, where each mold cavity is defined by a first mold cavity portion and a second mold cavity portion coupled to the first mold cavity portion;
- a plurality of first and second mold cores, where each first mold core is angled with respect to the respective second mold core;
- a stripper plate comprising bores that is movable from a first position to a second position when the mold is in a closed position and in an open position, where the mold cores are at least partially located in the bores of the stripper plate; and
- the fluid sealing system of claim 1, including the cooling slider and the mold plate.

10. The injection molding apparatus of claim 9, wherein the stripper plate is movable from a first position to a second position only when the mold is in an open position.

11. The injection molding apparatus of claim 9, wherein the stripper plate is movable from a first position to a second position only when the mold is in a closed position.

12. The injection molding apparatus of claim 9, wherein where the movement of the cooling slider is generated by the movement of the stripper plate during ejection of the molded parts from the mold cores.

13. The injection molding apparatus of claim 9, wherein the plurality of injection nozzles are thermal gated nozzles.

14. The injection molding apparatus of claim 9, wherein the plurality of injection nozzles include a valve pin actuated by pneumatic actuators.

15. The injection molding apparatus of claim 9, wherein the plurality of injection nozzles include a valve pin actuated by electric actuators.

\* \* \* \* \*